United States Patent
Rajeswaran et al.

(10) Patent No.: US 8,759,675 B2
(45) Date of Patent: Jun. 24, 2014

(54) DUAL PURPOSE CASING

(76) Inventors: Lakshman Rajeswaran, Wallingford, PA (US); Thomas F Pepe, Missouri City, TX (US); Jeremy Groh, Harrisburg, PA (US); Nathan Trunfio, Conshohocken, PA (US)

( * ) Notice: Subject to any disclaimer, the term of this patent is extended or adjusted under 35 U.S.C. 154(b) by 106 days.

(21) Appl. No.: 13/605,793

(22) Filed: Sep. 6, 2012

(65) Prior Publication Data

US 2013/0057126 A1 Mar. 7, 2013

Related U.S. Application Data

(60) Provisional application No. 61/532,046, filed on Sep. 7, 2011.

(51) Int. Cl.
- *B65D 85/00* (2006.01)
- *H04W 99/00* (2009.01)
- *H05K 5/00* (2006.01)
- *H05K 5/03* (2006.01)

(52) U.S. Cl.
USPC ............ 174/50; 206/724; 206/723; 206/701; 455/575.1; 361/679.3; 361/679.25; 361/679.56; 361/679.01; 312/223.1

(58) Field of Classification Search
USPC .......... 312/223.1; 361/679.01, 679.3, 679.25, 361/816, 679.56; 206/701, 702, 706, 722, 206/723, 724, 725, 320, 305, 449
See application file for complete search history.

(56) References Cited

U.S. PATENT DOCUMENTS

| | | | | |
|---|---|---|---|---|
| D517,311 S | * | 3/2006 | Kim | D3/218 |
| D563,093 S | * | 3/2008 | Nussberger | D3/201 |
| D624,064 S | * | 9/2010 | Esposito | D14/250 |
| D654,931 S | * | 2/2012 | Lemelman et al. | D14/496 |
| D681,620 S | * | 5/2013 | Huskinson | D14/250 |
| 2008/0053851 A1 | * | 3/2008 | Ko et al. | 206/320 |
| 2011/0053659 A1 | * | 3/2011 | Murphy | 455/575.1 |
| 2011/0077061 A1 | * | 3/2011 | Danze et al. | 455/575.1 |
| 2011/0136555 A1 | * | 6/2011 | Ramies et al. | 455/575.8 |
| 2011/0277892 A1 | * | 11/2011 | Black | 150/148 |
| 2011/0294556 A1 | * | 12/2011 | Carlberg et al. | 455/575.8 |
| 2012/0074006 A1 | * | 3/2012 | Monaco et al. | 206/320 |
| 2012/0077556 A1 | * | 3/2012 | McKendrick | 455/575.8 |
| 2012/0261306 A1 | * | 10/2012 | Richardson et al. | 206/778 |
| 2013/0220847 A1 | * | 8/2013 | Fisher et al. | 206/216 |

OTHER PUBLICATIONS

Eyn, date unknown, retrieved from http://www.eynproducts.com/ on Feb. 7, 2014.*
dhgate, date unkown, retrieved from http://www.dhgate.com/store/product/new-cell-phone-case-25-pcs-purple-amp-black/161312310.html on Feb. 7, 2014.*

* cited by examiner

*Primary Examiner* — Robert J Hoffberg
*Assistant Examiner* — Michael Matey
(74) *Attorney, Agent, or Firm* — Wilson D. Swayze, Jr.

(57) ABSTRACT

Disclosed is a casing for an electronic wireless handheld device defined by a front panel, a rear panel, and a plurality of side panels connecting the front and rear panels wherein, the device is to be received within the casing such that the front and rear exterior surfaces of the device abut the interior surfaces of the front and rear panels respectively. The casing comprises at least one receptacle wherein, each of the at least one receptacle is adapted to receive therewithin at least one accessory of the device and the like.

10 Claims, 5 Drawing Sheets

DUAL PURPOSE CASING

CROSS-REFERENCE TO RELATED APPLICATIONS

This application claims benefit of priority of U.S. Provisional Patent Application Ser. No. 61/532,046, filed Sep. 7, 2011, entitled "CASE FOR ANY ELECTRONIC DEVICE THAT HOUSES THE CHARGING CORD, BATTERY, AND OR USB ADAPTOR WITH PRONGS VIA A DEEPENED CHANNEL OR EXTENSION IN CASE", owned by the assignee of the present application and herein incorporated by reference in its entirety.

BACKGROUND

The present invention relates to accessories for electronic handheld devices, and more particularly to protective casings for handheld devices, and even more particularly to a casing of a handheld device with a provision for carrying one or more accessories thereof.

It's no news that wireless handheld devices such as cellular phones, tablets, and the like, are an indispensible part of peoples' lives today. Generally, these devices have a battery life that lasts around eight to nine hours and have a talk time of roughly four hours. And, owing to our increased attachment to these devices, it is always quite an inconvenience if these devices run out of charge especially, when a charging means thereof is not around. For those who cannot afford to have their devices "die" due to lack of charge, they are obligated to carry along the charging means, such as a travel adapter or a USB cable, in order to ensure that the battery is always backed up. However, carrying a travel adapter or a USB cable separately in itself can be quite a task for the user. Also, adding fuel to the fire is that fact that, these cables and wires can be unmanageable as they get tangled quite often. There is surely a necessity in the art for a solution that can address aforementioned problem.

SUMMARY

The present invention solves the aforementioned problem by providing a dual purpose casing for wireless handheld devices such as a cellular phone, tablet, and the like, wherein, the casing is not only used for protecting the device, but also for carrying an accessory, such as a USB cable, or the like, within a receptacle, which is a part of a casing itself. In one embodiment, the casing comprises a receptacle-access door located thereon for storing and retrieving the contents of the receptacle.

The other objects and advantages of the embodiments herein will become readily apparent from the following detailed description taken in conjunction with the accompanying drawings.

BRIEF DESCRIPTIONS OF THE DRAWINGS

FIGURES—REFERENCE NUMERALS

10 . . . Dual Purpose Casing
12 . . . Electronic Wireless Handheld Device
14 . . . Accessory
16 . . . Front Panel
18 . . . Rear Panel
20 . . . Side Panel
22 . . . Interface Window
24 . . . Opening
26 . . . Receptacle
28 . . . Casing-Access Door
30 . . . Receptacle-Access Door

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
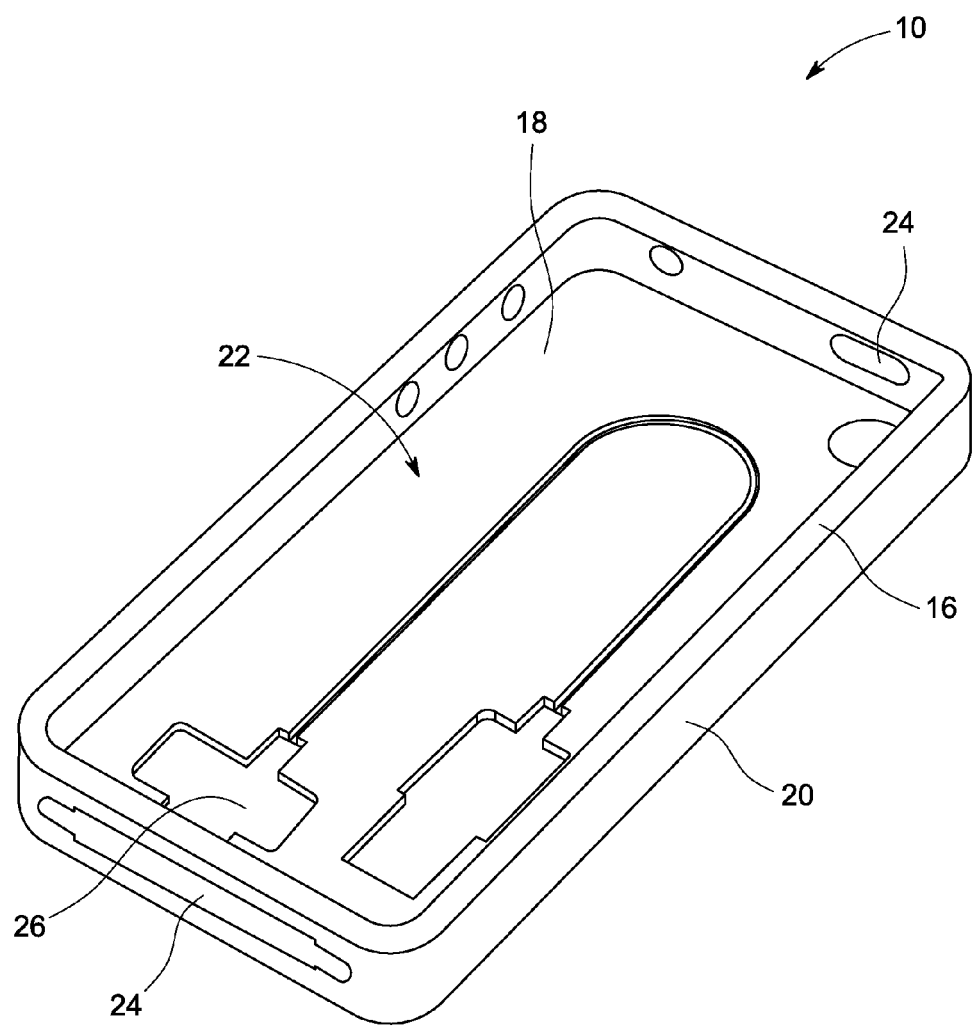
FIG. 1 is a perspective view of the casing according to one embodiment of the present invention.
Figure 2:
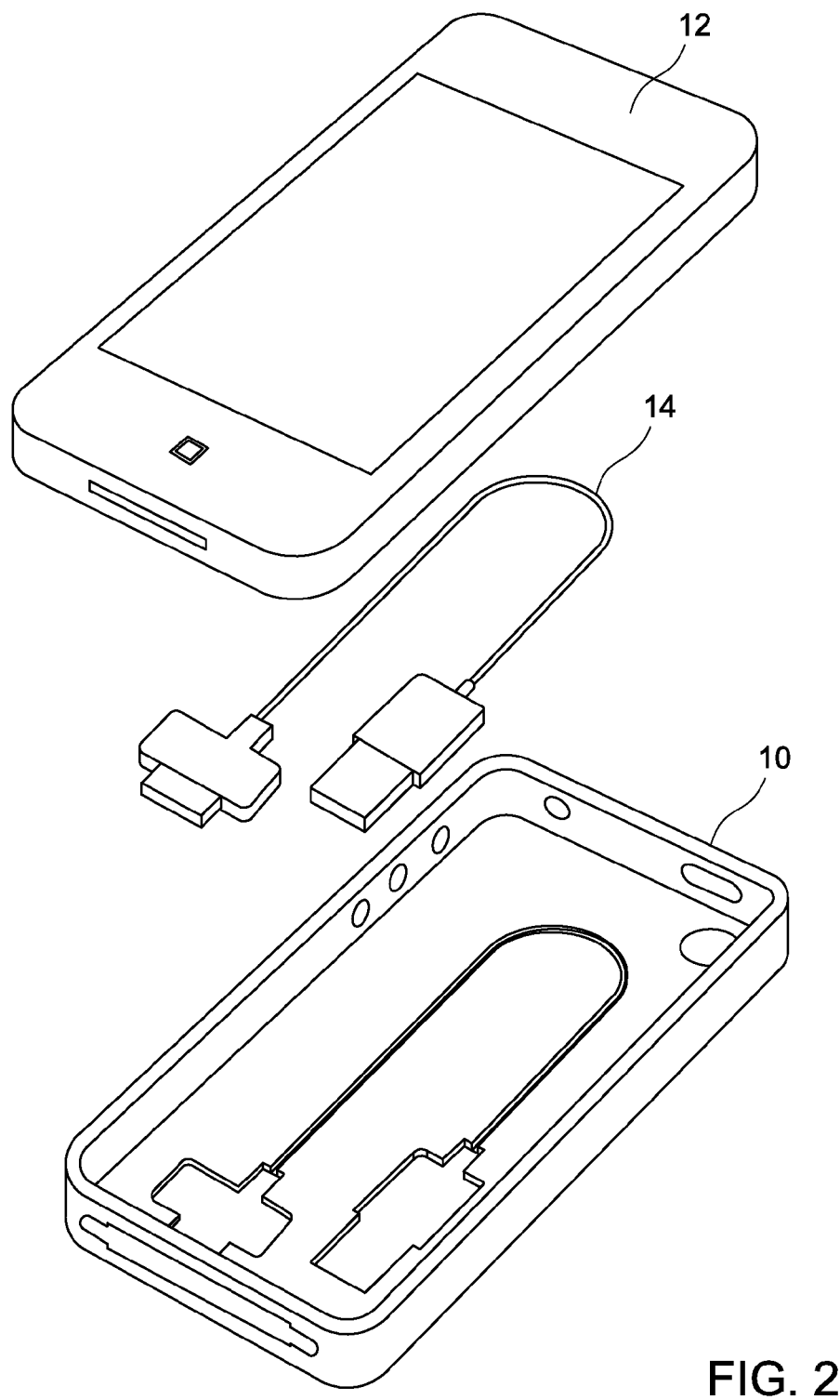
FIG. 2 is an exploded view of the casing of FIG. 1, the accessory, and the device.
Figure 3:
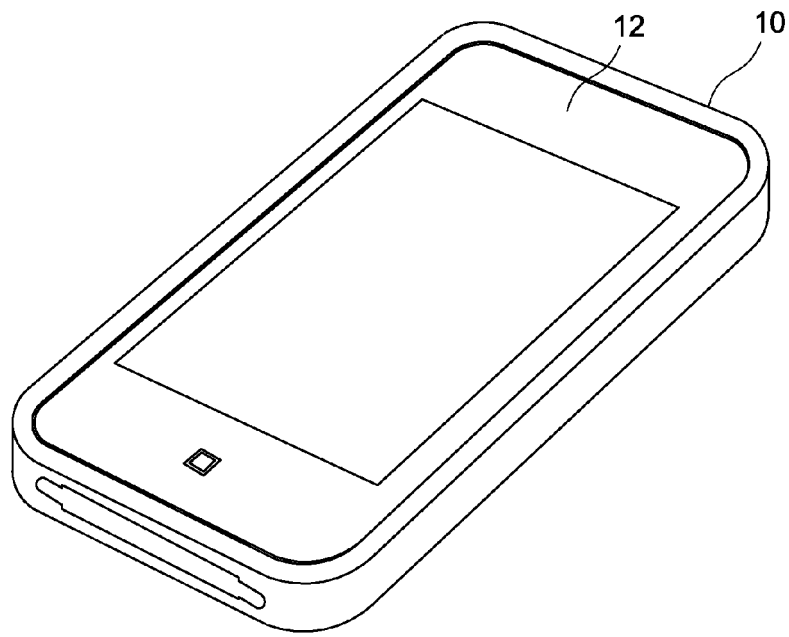
FIG. 3 is a perspective view of the casing of FIG. 1 with the device disposed therein.

Referring to FIGS. 1 through 3, the present invention comprises a dual purpose casing 10, which, apart from being used for protecting a wireless handheld electronic device 12 such as a cellular phone, tablet, and the like, from potential damages due to abrasion, shock, dings, drops, and etc, is also used for enabling a user of the device 12 to carry an accessory 14 of the device 12, such as a USB cable, therewithin. The casing 10, which is basically a receptacle for receiving the handheld device therein, is defined by a substantially rectangular front panel 16, rear panel 18, and four side panels 20 connecting the four edges of the front and rear panels 16 and 18 as seen in the referred figures. The front panel 16 comprises a central rectangular opening, which will be referred to as "interface window" 22 hereinafter. The interface window 22 enables a user to access the front operable surface of the device 12 which, generally comprises a touch screen, a keypad, a display screen, or a combination thereof. In other words, the interface window 22 facilitates an interface between the user and the device 12. The casing 10 further comprises a plurality of openings 24 on the front, rear, and the sides of the casing 10 so as to expose the inlet ports, such as, charger port, USB port, etc, and the controls of the devices, such as, a volume control, camera button, etc.

Still referring to FIGS. 1 through 3, the casing 10 is shaped such that the interior of the casing 10 substantially conforms to the contour of the exterior of the device 12 and thereby inhibits the movement of the device 12 within the casing 10 as the device 12 is received within the casing 10. More particularly, the interior surfaces of the front and rear panels 16 and 18 abut front and rear surfaces of the device 12 respectively as the device 12 is received within the casing 10. The casing 10 is made of material that is resilient enough to permit the ingress and egress of the device 12 into and out of the casing 10 through the interface window 22 as the casing 10 is stretched.

Still referring to FIGS. 1 through 3, the rear panel 18 includes the receptacle 26 therein for receiving an accessory or accessories 14, such as a USB data cable, ear phones, spare battery, and etc, and as a result of which, the rear panel 18 is thicker than the front and the side panels 16 and 20. More particularly, the receptacle 26 is disposed on the interior surface of the rear panel 18 wherein, the interior surface of the rear panel 18 abuts the rear exterior surface of the device 12 when the device 12 is within the casing 10. In one embodiment, the interior surface of the receptacle 26 is shaped after the contour of the accessory 14 so that, the accessory 14 is snugly received within the receptacle 26 inhibiting the movement of the accessory 14 within the receptacle 26. The user can only access the contents of the receptacle 26 through the interface window 22 and therefore, the device 12 needs to be removed from the casing 10 in order to access the receptacle 26.

Figure 4:
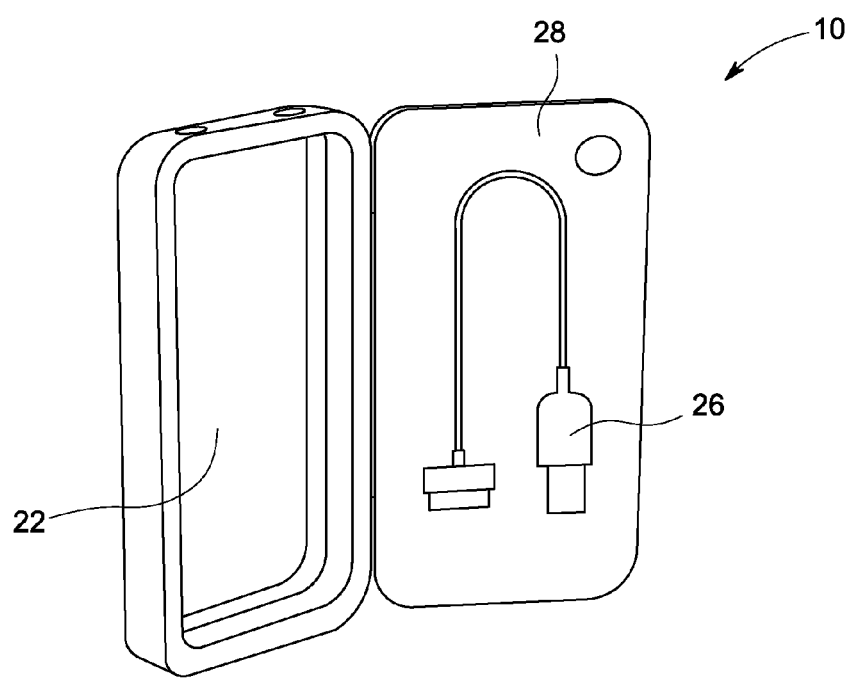
FIG. 4 is an illustration of the casing according to another embodiment of the present invention.
Figure 5:
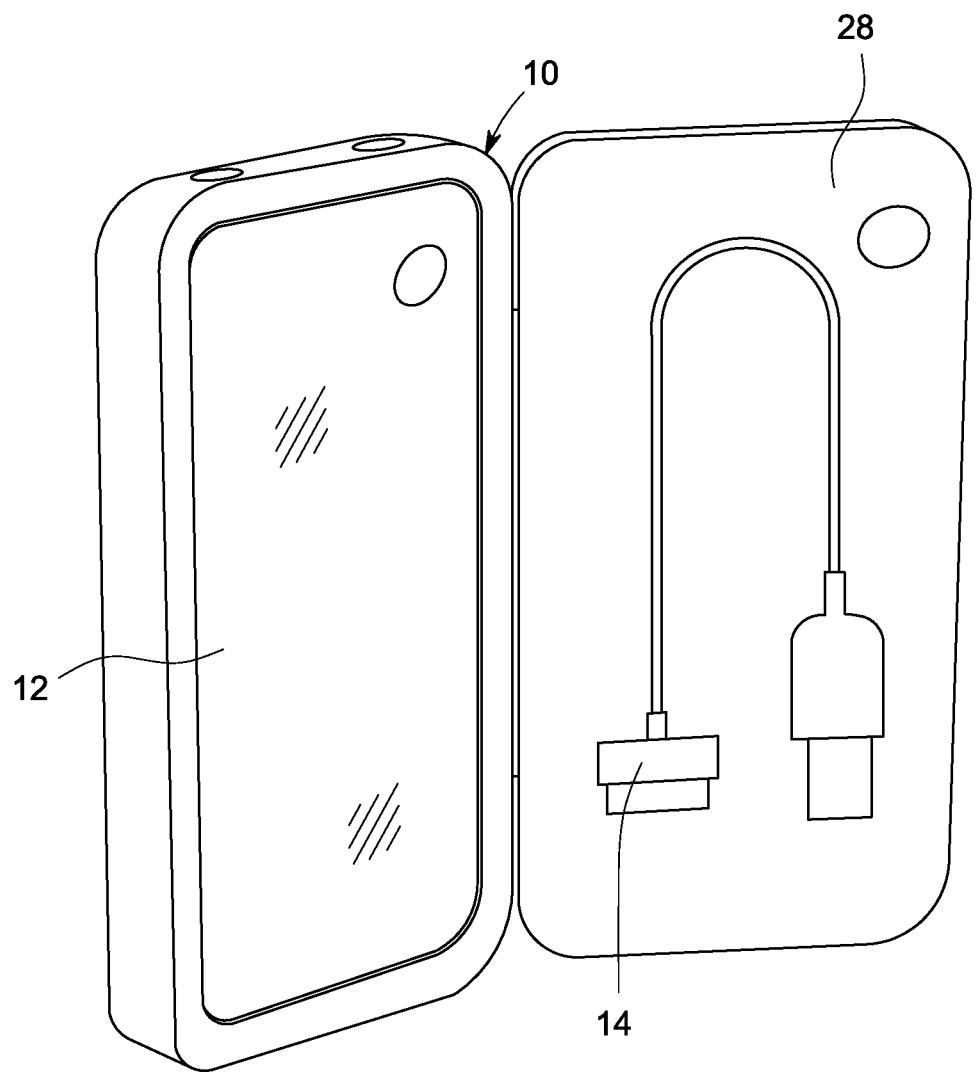
FIG. 5 is an illustration of the casing of FIG. 4 with the device and the accessory disposed therein.

Referring to FIGS. 4 and 5, in one embodiment of the present invention, the rear panel 18 is hingedly connected to an edge of a side panel 20 whereby, the rear panel 18 acts as a door, which will be referred to as "casing-access door" 28 hereinafter. In this embodiment, the casing 10 need not be made of a resilient material as the device 12 can be received into or removed from the casing 10 through the casing-access door 28. The receptacle 26, which is located in the interior surface of the casing-access door 28, is also accessible when the casing-access door 28 is open. The casing-access door 28 snaps into place when closed thereby securing the contents therein.

Figure 6:
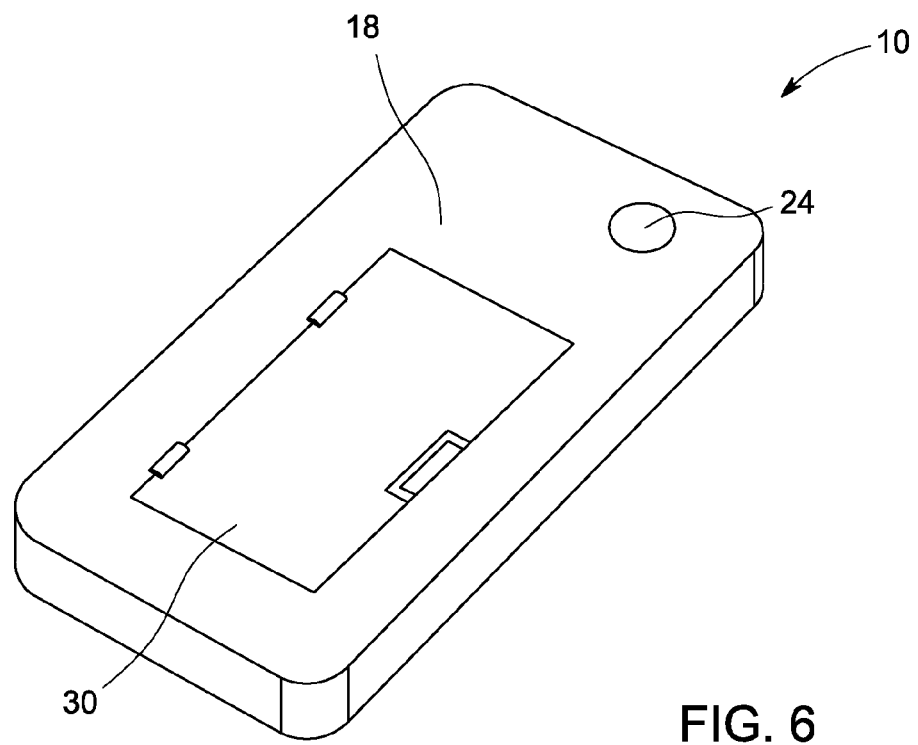
FIG. 6 is a perspective view of the casing according to yet another embodiment of the present invention.
Figure 7:
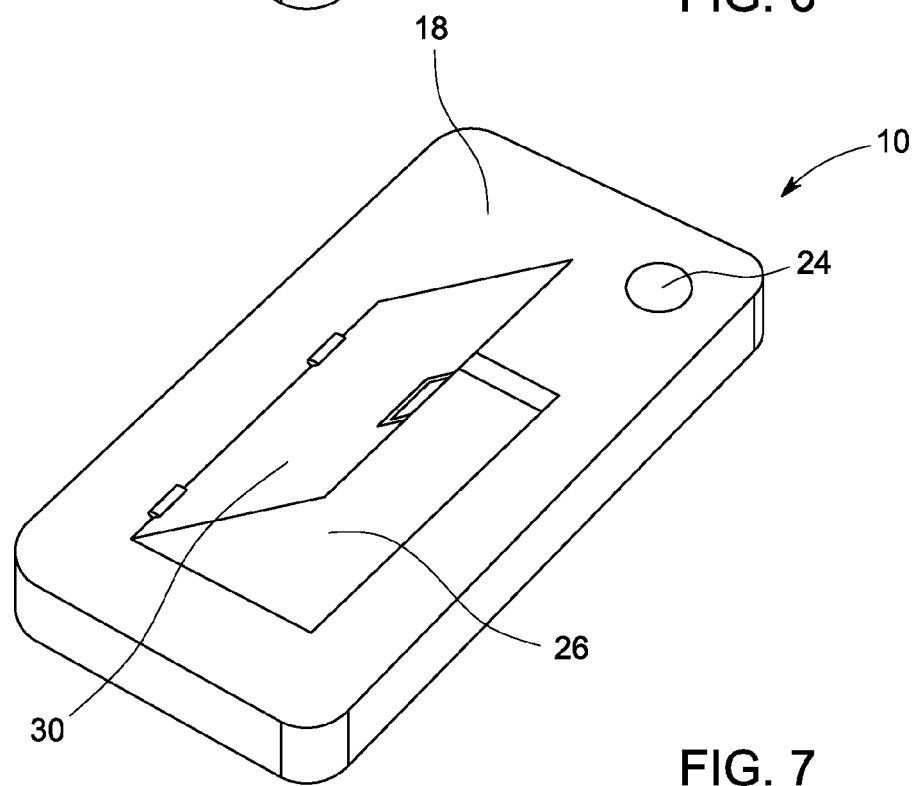
FIG. 7 is a perspective view of the casing of FIG. 6 with the receptacle-access door being open.

Referring to FIGS. 6 and 7, in one embodiment of the casing 10 of the present invention, the receptacle 26 is disposed on the exterior surface of the rear panel 18. A receptacle-access door 30, which is preferably hinged, is provided on the exterior surface of the rear panel 18 in order to access the receptacle 26.

On a final note, the casing 10 of the present invention is not only meant for cellular phones or tablets, but can also be used for other types of portable devices such as portable music devices (for example, an iPod™), portable gaming consoles, (for example, a Sony PSP™), and the like.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall therebetween.

What is claimed is:

1. A casing for an electronic wireless handheld device defined by a front panel, a rear panel, and a plurality of side panels connecting the front and rear panels, the device to be received within the casing such that the front and rear exterior surfaces of the device abut an interior surface of the front and rear panels respectively, the front panel including an interface window for facilitating an interface between the device and a user thereof, with the interface window comprising an opening; the casing comprising at least one receptacle abutting the interior surface of the rear panel, wherein the at least one receptacle is disposed between the interior surface of the rear panel and the rear exterior surface of the rear panel of the device as the device is received within the casing; the at least one receptacle is adapted to receive therewithin at least one accessory of the device; and the at least one receptacle to be accessed through the interface window in an the absence of the device within the casing.

2. The casing of claim 1 wherein, the rear panel is hingedly connected to one of the plurality of side panels whereby, the rear panel can be moved between an open position and a closed position; contents of the at least one receptacle accessible in the open position.

3. The casing of claim 1 wherein, the casino being resilient enough for the device to be inserted into and removed from the casing through the interface window.

4. The casing of claim 1 wherein, a contour of a receptacle interior surface of each of the at least one receptacle is shaped such that a corresponding one of the at least one accessory is received snugly therewithin.

5. The casing of claim 1 wherein, contours of the interior surfaces of the front and rear panels and interior surfaces of the plurality of side panels of the casing substantially match with that of the exterior surfaces of the device including the front and rear exterior surfaces of the device, whereby, the device is snugly received within the casing.

6. The casing of claim 1 wherein, the at least one receptacle abuts the exterior surface of the rear panel.

7. The casing of claim 6 wherein, each of the at least one receptacle is accessed through a receptacle-access door.

8. The casing of claim 1 wherein, the at least one receptacle comprises one receptacle.

9. The casing of claim 1 wherein, the at least one accessory comprises one accessory.

10. A protective casing for an electronic wireless handheld device defined by a front panel, a rear panel, and a plurality of side panels connecting the front and rear panels, the device to be received within the casing such that the front and rear exterior surfaces of the device abut the interior surfaces of the front and rear panels respectively, the front panel including an interface window for facilitating an interface between the device and a user thereof, the casing comprising at least one receptacle abutting the exterior surface of the rear panel, wherein the at least one receptacle is disposed between the interior surface of the rear panel and the exterior surface of the device as the device is received within the casing;

the at least one receptacle is adapted to receive therewithin a corresponding one of at least one accessory of the device; and the at least one receptacle to be accessed through a receptacle-access door.

* * * * *